US012699369B2

(12) United States Patent
Sampath et al.

(10) Patent No.: US 12,699,369 B2
(45) Date of Patent: Aug. 4, 2026

(54) DATA-ANALYSIS-BASED PROCESSING OF ARTIFICIAL INTELLIGENCE RECOMMENDED CONTROL SETPOINT

(71) Applicant: INTERNATIONAL BUSINESS MACHINES CORPORATION, Armonk, NY (US)

(72) Inventors: Kameshwaran Sampath, Bengaluru (IN); Chandramouli Kamanchi, Guntur District (IN); Arindam Jati, Bengaluru (IN); Sumanta Mukherjee, Bangalore (IN); Pankaj Satyanarayan Dayama, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 18/489,942

(22) Filed: Oct. 19, 2023

(65) Prior Publication Data

US 2025/0130541 A1     Apr. 24, 2025

(51) Int. Cl.
*G05B 13/04* (2006.01)

(52) U.S. Cl.
CPC .................................. *G05B 13/048* (2013.01)

(58) Field of Classification Search
CPC ........................... G05B 13/048; G05B 13/0265
USPC .......................................................... 700/28
See application file for complete search history.

(56) References Cited

U.S. PATENT DOCUMENTS

| | | | |
|---|---|---|---|
| 9,823,626 B2 | 11/2017 | Zornio et al. | |
| 2017/0351226 A1 | 12/2017 | Bliss et al. | |
| 2021/0086198 A1* | 3/2021 | Bromfield | ................ B03D 1/16 |
| 2023/0021210 A1* | 1/2023 | Servais | .................... G06N 3/08 |

(Continued)

FOREIGN PATENT DOCUMENTS

WO     WO 2022/106997 A1     5/2022

OTHER PUBLICATIONS

Al, Mingxi et al., "Deep Learning Feature-Based Setpoint Generation and Optimal Control for Flotation Processes", Information Sciences, 578, pp. 664-658 (15 pages) (Year: 2021).

(Continued)

*Primary Examiner* — Jigneshkumar C Patel
(74) *Attorney, Agent, or Firm* — Robert D. Bean, Esq.; Kevin P. Radigan, Esq.; Heslin Rothenberg Farley & Mesiti P.C.

(57)          ABSTRACT

Setpoint control processing is provided which includes generating, for a current state of a process, an artificial intelligence recommended control setpoint for the process, and obtaining, by one or more processors, historical process state instances, and associated control setpoints, related to the current state of the process. The artificial intelligence recommended control setpoint for the process is compared, by the one or more processors, to the associated control setpoints of the historical process state instances related to current state of the process. Based on a result of the comparing, a control system setpoint for the process is updated for optimal control of the process for a current process optimization objective, and the process is operated using the updated control system setpoint to optimally control the process for the current process optimization objective.

20 Claims, 8 Drawing Sheets

(56)         References Cited

U.S. PATENT DOCUMENTS

2023/0349577 A1\*    11/2023   Mischler ................. F24F 11/46
2023/0408988 A1\*    12/2023   Korb ................... G05B 13/028

OTHER PUBLICATIONS

Anonymous, "Explaining Time Series by Counterfactuals", International Conference on Learning Representations (ICLR) 2020 (17 pages) (Year: 2020).
Chen, Chao-Rong et al., "k-Nearest Neighbor Neural Network Models for Very Short-Term Global Solar Irradiance Forecasting Based on Meteorological Data", Energies 2017, 10, 186 (18 pages) (Year: 2017).
Kalagnanam, Jayant et al., "AI-Based Real-Time Site-Wide Optimization for Process Manufacturing", INFORMS Journal on Applied Analytics, published Jun. 22, 2022 (4 pages) (Year: 2022).
Schwenzer, Max et al., "Review on Model Predictive Control: An Engineering Perspective", Int'l. Journal of Advanced Manufacturing Technology, 117, pp. 1327-1349 (23 pages) (Year: 2021).

\* cited by examiner

100

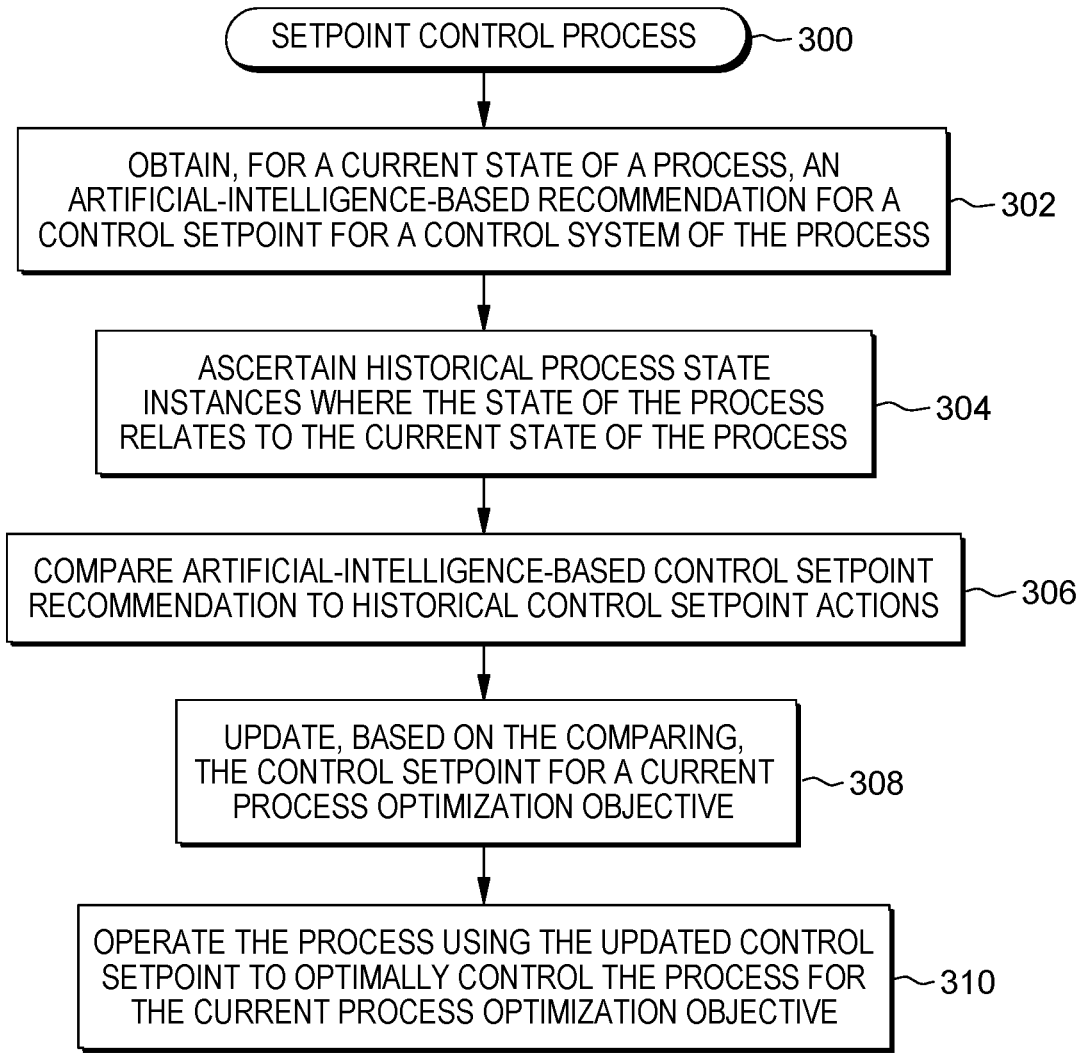

SETPOINT CONTROL PROCESS ~300

OBTAIN, FOR A CURRENT STATE OF A PROCESS, AN ARTIFICIAL-INTELLIGENCE-BASED RECOMMENDATION FOR A CONTROL SETPOINT FOR A CONTROL SYSTEM OF THE PROCESS ~302

ASCERTAIN HISTORICAL PROCESS STATE INSTANCES WHERE THE STATE OF THE PROCESS RELATES TO THE CURRENT STATE OF THE PROCESS ~304

COMPARE ARTIFICIAL-INTELLIGENCE-BASED CONTROL SETPOINT RECOMMENDATION TO HISTORICAL CONTROL SETPOINT ACTIONS ~306

UPDATE, BASED ON THE COMPARING, THE CONTROL SETPOINT FOR A CURRENT PROCESS OPTIMIZATION OBJECTIVE ~308

OPERATE THE PROCESS USING THE UPDATED CONTROL SETPOINT TO OPTIMALLY CONTROL THE PROCESS FOR THE CURRENT PROCESS OPTIMIZATION OBJECTIVE ~310

|  | POSITIVE CONTROL ACTION | NEGATIVE CONTROL ACTION |
|---|---|---|
| CONTEXT GUIDED EVIDENCE | OK | HIGH RISK |
| MINIMAL EVIDENCE | WEAK EVIDENCE | PROBABLE RISK |
| NO EVIDENCE | UNCERTAIN | |

FIG. 7

DATA-ANALYSIS-BASED PROCESSING OF ARTIFICIAL INTELLIGENCE RECOMMENDED CONTROL SETPOINT

BACKGROUND

This disclosure relates generally to facilitating control of a process, such as a manufacturing or industrial process, and more particularly, to obtaining a control setpoint for the process which facilitates a desired process optimization objective.

A production system in manufacturing and industrial industries can include one or more processes, each of which can have a self-contained set of inputs and outputs, with the outflow from an upstream process becoming inflow to a downstream process. Within a unit process, there can be a complex relationship between various setpoints, material inflows, and throughput and quality of the desired output. A production site or system can be a complex network of these unit processes. In a simplified case, the control system or operator may want to optimize the overall production output by leveraging a variety of sensor data and process controls (setpoints).

Data-analytics-based artificial intelligence (AI) predictive modeling can be used to facilitate control of a process. In process control setup, data-driven predictive AI models enable local estimation of process response to a setpoint change. This allows control setpoint recommendations based on forecasts or predictions. A setpoint recommendation often involves a local search (optimization) that maximizes an objective function by via ex-ante analysis, to determine a best setpoint recommendation. The benefit of data-driven analysis is its adaptability with changing process operating conditions, and ability to handle the process as a black box.

SUMMARY

Certain shortcomings of the prior art are overcome, and additional advantages are provided herein through the provision of a computer-implemented method which includes generating, for a current state of a process, an artificial intelligence recommended control setpoint for the process, and obtaining, by one or more processors, historical process state instances, and associated control setpoints, related to the current state of the process. In addition, the computer-implemented method includes comparing, by the one or more processors, the artificial intelligence recommended control setpoint for the process to one or more associated control setpoints of the historical process state instances related to the current state of the process. Further, the computer-implemented method includes updating, based on a result of the comparing a control system setpoint for the process for optimal control of the process for a current process optimization objective, and operating the process using the updated control system setpoint to optimally control the process for the current process optimization objective.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one embodiment of a setpoint control process, in accordance with one or more aspects of the present disclosure;

FIG. 7 depicts different scenarios possible with evidence-based evaluation of an artificial intelligence-based setpoint recommendation using setpoint control processing, in accordance with one or more aspects of the present disclosure.

DETAILED DESCRIPTION

The accompanying figures, which are incorporated in and form a part of this specification, further illustrate the present disclosure and, together with this detailed description of the disclosure, serve to explain aspects of the present disclosure. Note in this regard that descriptions of well-known systems, devices, processing techniques, etc., are omitted so as to not unnecessarily obscure the disclosure in detail. It should be understood, however, that the detailed description and specific example(s), while indicating aspects of the disclosure, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

Figure 1:
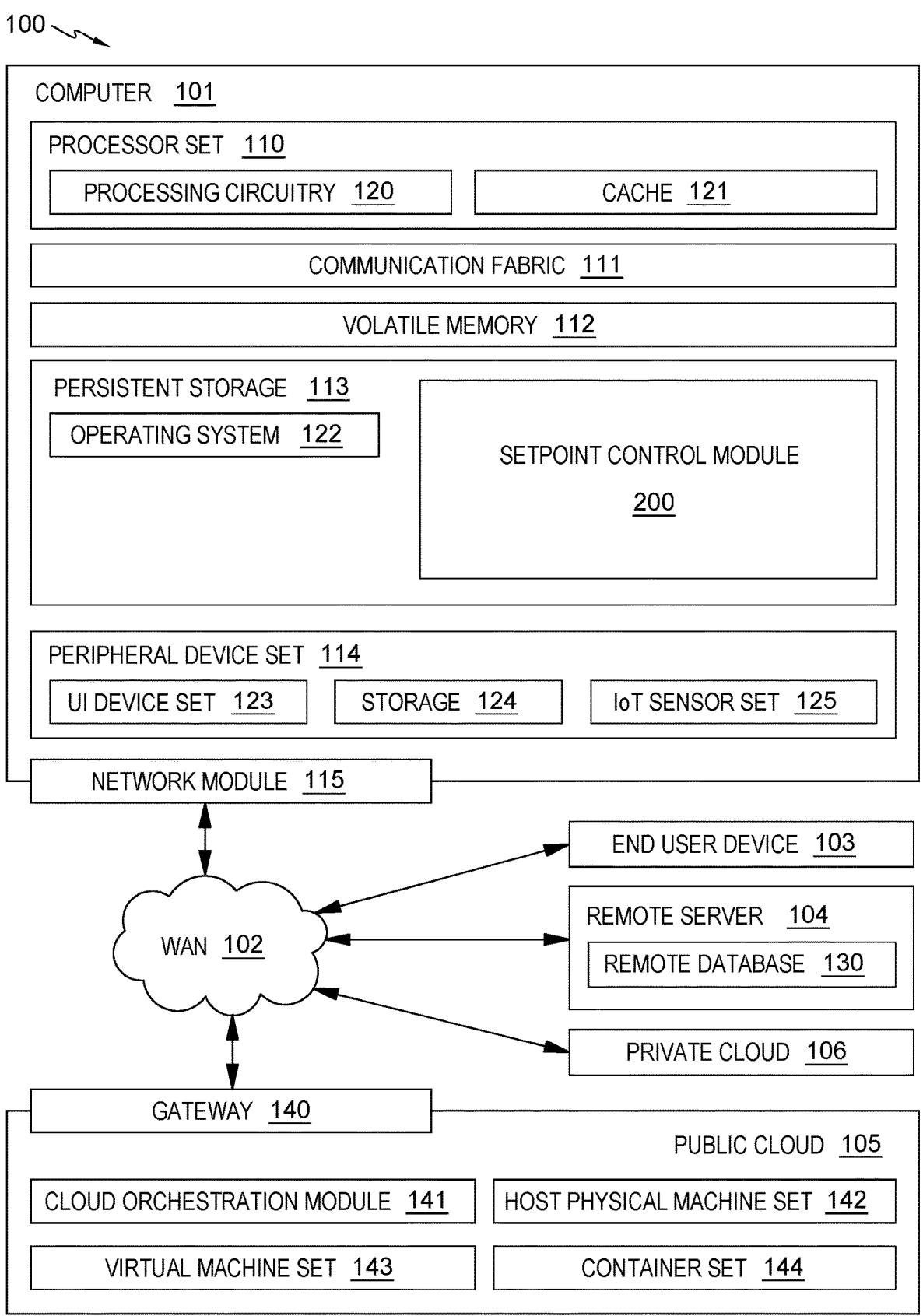
FIG. 1 depicts one example of a computing environment to include and/or use one or more aspects of the present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and setpoint control module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform setpoint control processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as setpoint control module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
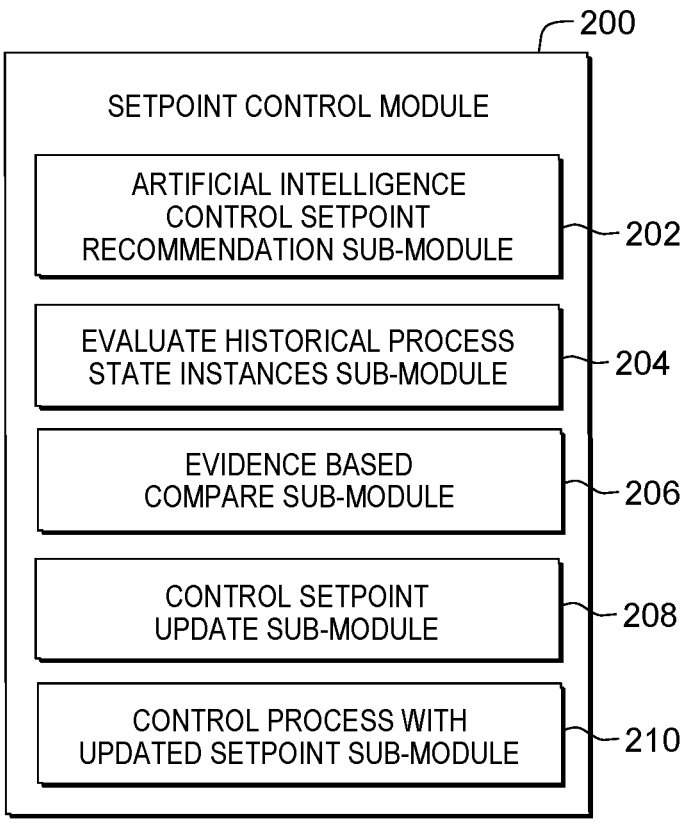
FIG. 2 depicts one embodiment of a computer program product with a setpoint control module, in accordance with one or more aspects of the present disclosure.

By way of example, one or more embodiments of a setpoint control module and process are described initially with reference to FIGS. 2-3. FIG. 2 depicts one embodiment of setpoint control module 200 that includes code or instructions to perform setpoint control processing, in accordance with one or more aspects of the present disclosure, and FIG. 3 depicts one embodiment of a setpoint control process, in accordance with one or more aspects of the present disclosure.

Referring to FIGS. 1-2, setpoint control module 200 includes, in one example, various sub-modules used to perform processing, in accordance with one or more aspects of the present disclosure. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

As noted, FIG. 2 depicts one embodiment of a setpoint control module 200 which, in one or more embodiments, includes, or provides setpoint control processing in accordance with one or more aspects of the present disclosure. In the embodiment of FIG. 2, example sub-modules of setpoint control module 200 include an artificial intelligence control setpoint recommendation sub-module 202 to provide, for a current state of a process, an artificial intelligence recommended control setpoint for the process. In one or more embodiments, setpoint control module 200 also includes an evaluate historical process state instances sub-module 204 to facilitate obtaining, by one or more processors, historical process state instances, and associated control setpoints, related to the current state of the process, and an evidence-based compare sub-module 206 to compare the artificial intelligence recommended control setpoint for the process to one or more associated control setpoints of the historical process state instances related to the current state of the process.

In one or more embodiments, setpoint control module 200 further includes a control setpoint update sub-module 208 to update, based on a result of the comparing, a control system setpoint for the process for optimal control of the process for a current process optimization objective. In addition, in one or more embodiments, setpoint control module 200 includes a control process with updated setpoint sub-module 210 to operate the process using the updated control system setpoint to optimally control the process for the current process optimization objective.

Advantageously, setpoint control module processing such as disclosed herein facilitates, in one or more embodiments, control of a process, such as a manufacturing or industrial process, using evidence-based refinement or verification of an artificial intelligence (AI) predictive control setpoint for the process. Along with an ex-ante setpoint recommendation from an artificial intelligence engine, for instance, from one or more machine learning models, evidence-driven evaluation of the AI-recommended control setpoint is provided to facilitate, for instance, acceptance or refinement of the artificial intelligence recommended control setpoint to ensure or obtain an in-distribution control setpoint for the process to optimally control the process for the current process optimization objective. In this manner, acceptance of data-driven artificial intelligence setpoint recommendations can be enhanced. Advantageously, by comparing an artificial intelligence recommended control setpoint to context-relevant setpoints and process responses, process-specific dynamics and characteristics are inherently considered in verifying or refining the setpoint for process control, rather than relying solely on theoretical thresholds obtained from artificial intelligence modeling. In addition, in one or more embodiments, the potential risk with using an artificial intelligence-based recommendation can be identified, and the evidence-based processing disclosed herein enables the control system (and/or an operator) to interactively refine an artificial intelligence recommended control setpoint based on actual process responses.

Note that although various sub-modules are described herein, setpoint control module processing, such as disclosed can use, or include, additional, fewer, and/or different sub-modules. A particular sub-module can include additional code, including code of other sub-modules, or less code. Further, additional and/or other sub-modules can be used. Many variations are possible.

In one or more embodiments, the sub-modules are used, in accordance with one or more aspects of the present disclosure, to perform setpoint control processing. FIG. 3 depicts one example of a setpoint control process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as setpoint control module 200. In other examples, the code can be included in one or more other modules and/or in one or more sub-modules of the one or more other modules. Various options are available.

As one example, setpoint control process 300 executing on a computer (e.g., computer 101 of FIG. 1), a processor (e.g., a processor of processor set 110 of FIG. 1), and/or processing circuitry (e.g., processing circuitry of processor set 110), obtains, for a current state of a process, an artificial intelligence-based recommendation for a control setpoint for a control system of the process 302. For instance, a data-driven predictive artificial intelligence model, such as described herein, locally estimates a processor's response to a setpoint change, and based on the estimate(s), provides a control setpoint recommendation ex-ante. In one or more embodiments, setpoint control process 300 further includes ascertaining historical process state instances where the state of the process relates to the current state of the process 304. In this manner, context-relevant control setpoints or setpoint actions are obtained as evidence of actual process responses based on the previously used setpoints.

In one or more embodiments, the setpoint control process 300 compares the artificial intelligence-based control setpoint recommendation to the historical control setpoint actions 306. In one implementation, this can include analyzing ascertained historical process state instances related to the current state of the process, and based on process responses to the associated setpoint controls, the setpoint controls are grouped into a positive (or favorable) action group, and a negative (or unfavorable) action group, where the positive action group contains associated setpoint control actions with process responses that facilitate the current process optimization objective, and the negative action group contains associated setpoint control actions with process responses that are potentially unfavorable to the current process optimization objective. In this manner, historical process evidence can be used to verify, or to refine, the artificial intelligence-based control setpoint recommendation.

In one or more embodiments, the setpoint control process 300 further includes updating, based on the comparing, the control system setpoint for the current process optimization objective 308. For instance, in one or more embodiments, as part of evidence-based processing of the control setpoint recommendation, the setpoint control process provides an evidence-vetted control setpoint for the control system to use for the process. The evidence-based control setpoint can be, for instance, the artificial intelligence recommended control setpoint in the case where the recommended control setpoint is within a contour of the positive action group, or an evidence refined control setpoint in the case where the recommended control setpoint is outside the positive action group, for instance, in the negative action group.

In one or more embodiments, setpoint control process 300 operates the process using the updated control system setpoint to optimally control the process for the current process optimization objective 310.

Figure 4:
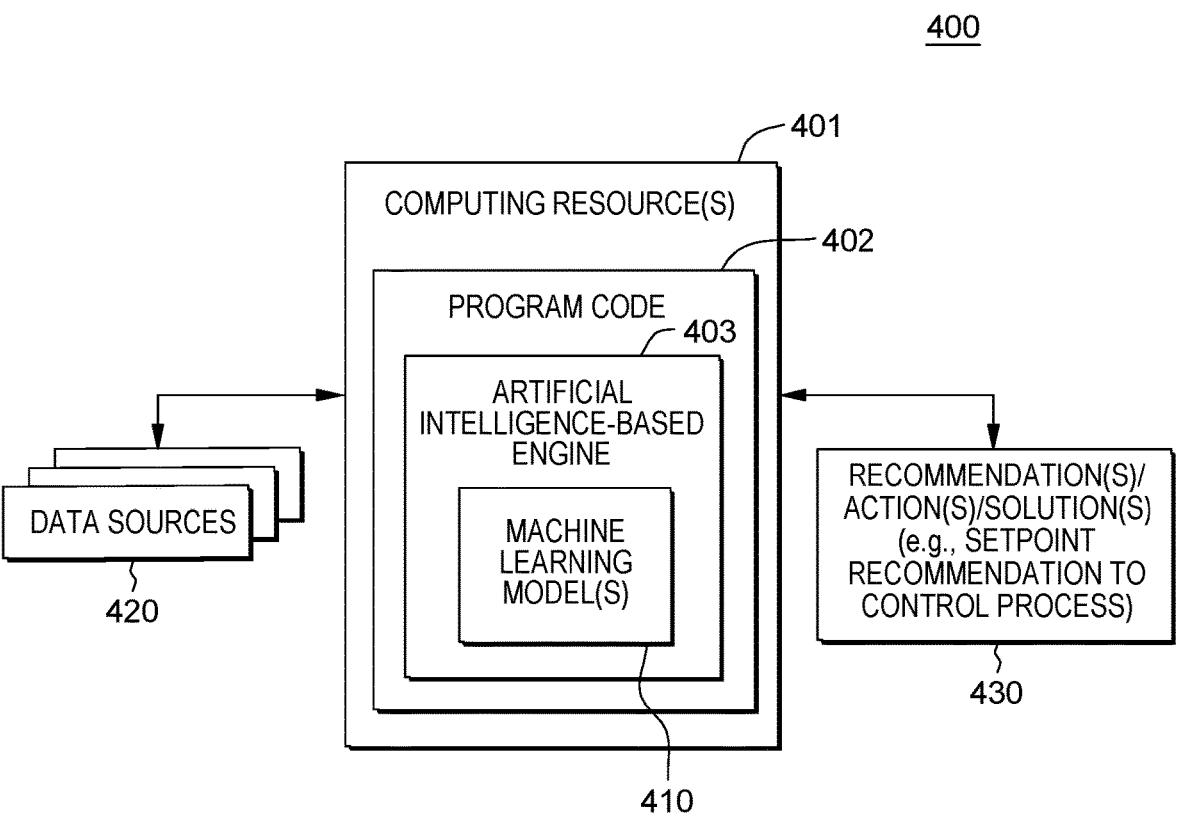
FIG. 4 is a further example of a computing environment to include and/or use one or more aspects of the present disclosure.

FIG. 4 depicts another embodiment of a computing environment or system 400, which can incorporate, or implement, one or more aspects of an embodiment of the present disclosure. In one or more implementations, system 400 is implemented as part of a computing environment, such as computing environment 100 described above in connection with FIG. 1. System 400 includes one or more computing resources 401 that execute program code 402 that implements, for instance, one or more aspects of a module or process such as disclosed herein, and which includes an artificial-intelligence-based engine 403, which can utilize one or more machine learning models 410, such as one or more machine learning setpoint control models to recommend a control setpoint for a process based on a current process optimization objective. Data, such as data measurements obtained from process monitoring devices, such as one or more Internet of Things (IoT) devices associated with the process, as well as historical control setpoint actions, can be used by the artificial intelligence-based engine (in one embodiment) to train machine learning model(s) 410 to (for instance) recommend a control setpoint for a current state of the process being controlled for a current process optimization objective 430, based on a particular application of the machine learning model(s). In one implementation, system 400 can include, or utilize, one or more networks for interfacing various aspects of computing resource(s) 401, as well as one or more data sources 420 providing data, and one or more components, systems, etc., receiving an output, action, etc., 430 of machine learning model(s) 410 to facilitate performance of one or more artificial intelligence system operations. By way of example, the network(s) can be, for instance, a telecommunications network, a local-area network (LAN), a wide-area network (WAN), such as the Internet, or a combination thereof, and can include wired, wireless, fiber-optic connections, etc., operatively coupling the computing resource(s) 401 to the to the data sources. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 401 house and/or execute program code 402 configured to perform methods in accordance with one or more aspects of the present disclosure. By way of example, computing resource(s) 401 can be a computing-system-implemented resource(s). Further, for illustrative purposes only, computing resource(s) 401 in FIG. 4 is depicted as being a single computing resource. This is a non-limiting example of an implementation. In one or more other implementations, computing resource(s) 401 can, at least in part, be multiple separate computing resources or systems, such as one or more computing resources of a cloud-hosting environment, by way of example only.

Briefly described, in one embodiment, computing resource(s) 401 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 402 executes artificial intelligence-based engine 403 which includes (and optionally trains) one or more models 410. The models can be trained using training data that can include a variety of types of data, depending on the model and the data sources. In one or more embodiments, program code 402 executing on one or more computing resources 401 applies one or more algorithms of artificial intelligence-based engine 403 to generate and train the model(s), which the program code then utilizes to, for instance, recommend a control setpoint for a current state of the process being controlled for the current process optimization objective 430. In an initialization or learning stage, program code 402 trains one or more machine learning models 410 using obtained training data that can include, in one or more embodiments, one or more data source inputs, such as described herein.

Data used to train the models, in one or more embodiments of the present disclosure, can include a variety of types of data, such as heterogeneous data generated by multiple data sources and/or data stored in one or more databases accessible by, the computing resource(s). Program code, in embodiments of the present disclosure, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 410, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present disclosure, the program code can utilize one or more neural networks to analyze training data and/or collected data to generate an operational machine-learning model 410. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine-learning model, such as described herein.

As noted, data-analytics-based artificial intelligence (AI) predictive modeling can be used to facilitate setpoint control of a process. In a process control setup, a data-driven predictive AI model is provided to enable local estimation of process response to a setpoint change. This allows control setpoint recommendations based on forecasts or predictions. Determining a setpoint recommendation can involve a local search (optimization) that maximizes an objective function via an ex-ante analysis to determine the best setpoint recommendation. The benefit of data-driven analysis is its adaptability with changing process operating conditions, and ability to handle the process as a black box. One challenge with data-analytics-based artificial intelligence predictive modeling is the risk associated with an ex-ante setpoint recommendation. In many control scenarios, a predictive artificial intelligence recommended setpoint, when applied to control of the process, can potentially lead to an unstable process condition. Addressing this issue, the control system disclosed herein, implements, along with an artificial intelligence-based ex-ante setpoint recommendation, evidence-based verification of the control setpoint recommendation, as well as evidence-based control setpoint refinement when advantageous. In one or more implementations, an evidence-driven risk assessment is also provided for implementing, for instance, an artificial intelligence-based control setpoint recommendation for a process. In addition, interactive generation of alternative "in distribution" setpoint refinements can be established when needed to allow the control system, or an operator, to assess the risk and take appropriate setpoint control action. In this manner, the evidence-based processing of an AI recommended control setpoint facilitates adoption of data-driven, artificial intelligence-based setpoint recommendations for a variety of processes, including production system processes and manufacturing or industrial industry processes.

Disclosed herein, in one or more aspects, are computer-implemented methods, computer systems and computer program products, which facilitate control of a process to, for instance, facilitate a current process optimization objective. In one or more embodiments, the computer-implemented method includes generating, for a current state of a process, an artificial intelligence recommended control setpoint for the process, and obtaining, by one or more processors, historical process state instances, and associated control setpoints, related to the current state of the process. In addition, in one or more embodiments, the computer-implemented method includes comparing, by the one or more processors, the artificial intelligence recommended control setpoint for the process to the associated control setpoints of the historical process state instances related to the current state of the process. Based on a result of the comparison, the computer-implemented method includes updating a control system setpoint for the process for optimal control of the process for a current process optimization objective, and operating the process using the updated control system setpoint to optimally control the process for the current process optimization objective.

In one or more embodiments, the computer-implemented method includes analyzing the ascertained historical process state instances, based on process responses to the associated control setpoints, and grouping the associated control setpoints into a positive action group and a negative action group, where the positive action group contains associated control setpoints with process responses that facilitate the current process optimization objective, and the negative action group contains associated control setpoints with process responses that are potentially unfavorable to the current process optimization objective.

In one or more embodiments, the current process optimization objective includes a process constraint, and the positive action group contains associated control setpoints which satisfy the process constraint, and the negative action group contains associated control setpoints which fail the process constraint.

In one or more embodiments, the comparing includes determining that the artificial intelligence recommended control setpoint falls within a contour of the positive action group, and based on the artificial intelligence recommended control setpoint falling within the contour of the positive action group, using the artificial intelligence recommended control setpoint in the updating of the control system setpoint for the process.

In one or more implementations, the comparing includes determining that the artificial intelligence recommended control setpoint falls within a contour of the negative action group, and based on the artificial intelligence recommended control setpoint falling within the contour of the negative action group, refining the artificial intelligence recommended control setpoint to obtaining a refined control setpoint that falls within the contour of the positive action group, and using the refined control setpoint in updating the control system setpoint for the process. In one embodiment, the refining includes modifying the artificial intelligence recommended control setpoint to obtain the refined control setpoint that falls within the contour of the positive action group with a least amount of compromise of the current process optimization objective.

In one or more embodiments, generating the artificial intelligence recommended control setpoint includes generating the artificial intelligence recommended control setpoint using a machine learning setpoint model, and the computer-implemented method further includes training the machine learning setpoint model to provide control setpoint recommendations for the process, where the training uses, at least in part, a dataset including historical data obtained from monitoring operation of the process.

In one or more embodiments, the computer-implemented method further includes providing a default control setpoint for use in updating of the control system setpoint where the obtaining fails to identify any historical process state instances, and associated control setpoints, related to the current state of the process.

In one or more embodiments, the computer-implemented method further includes determining, based on the comparing of the artificial intelligence recommended control setpoint for the process to the associated control setpoints for the historical process state instances related to the current state of the process, a risk factor associated with using the artificial intelligence recommended setpoint in the updating of the control system setpoint for the process.

Figure 5A:
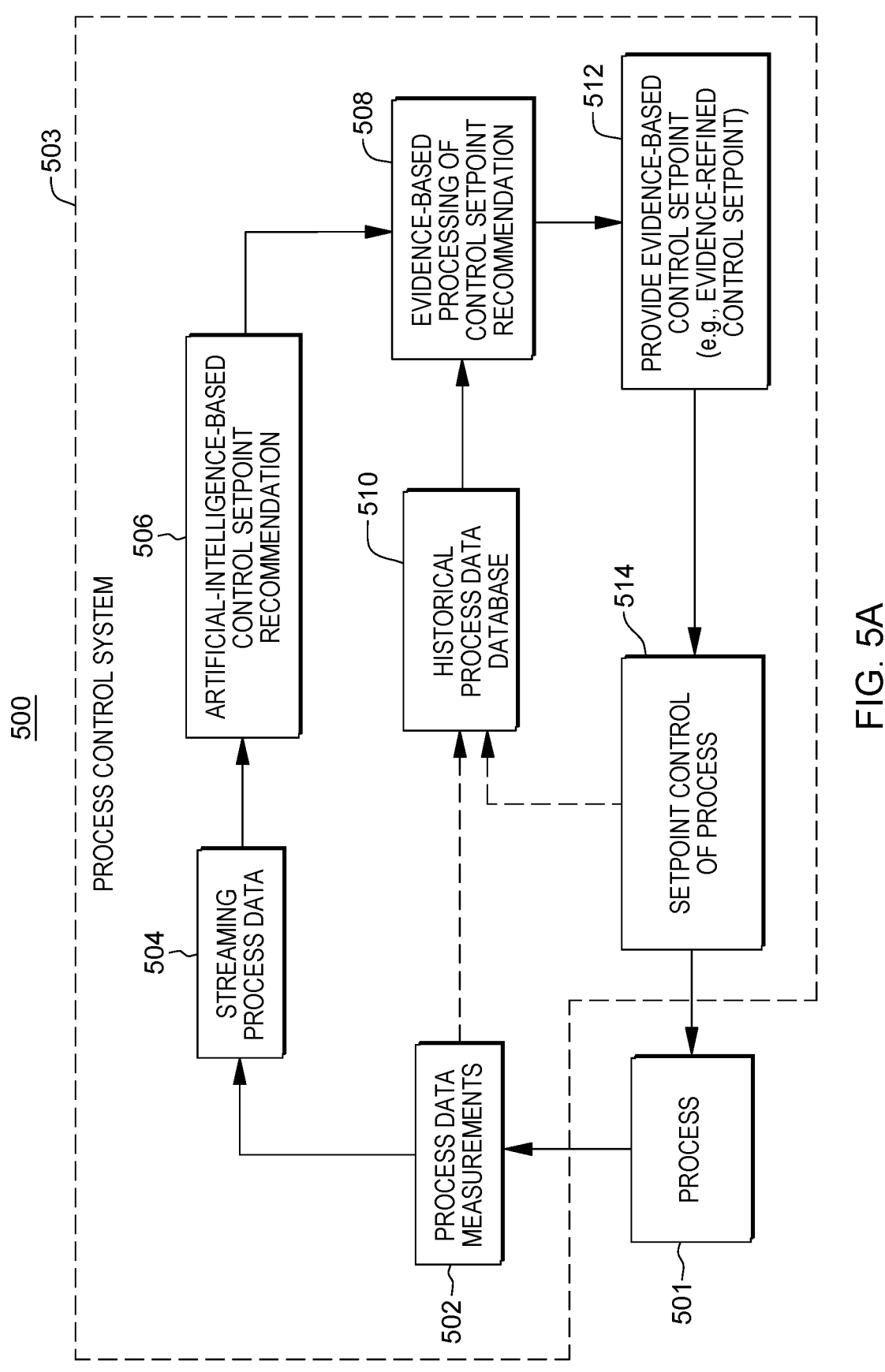
FIG. 5A is a block diagram of one embodiment of a process control system with control setpoint processing, in accordance with one or more aspects of the present disclosure.

By way of example, FIG. 5A is a block diagram of one embodiment of a process environment, generally denoted 500, which includes a process 501 and a process control system 503, where control system 503 includes setpoint control processing, in accordance with one or more aspects of the present disclosure. As noted, process 501 is any manufacturing or industrial process to be setpoint-controlled, and can be, or include, one or more unit processes of a more complex process or system being controlled. In one or more embodiments, process 501 can be a production system process, a manufacturing system process, an industrial system process, etc. Process control system 503 controls process 501 via one or more setpoints, each representative of a desired or target value for a respective variable of the process. Process control system 503 facilitates the desired operation of process 501 and includes, for instance, measurement, valuation and control aspects, such as described herein.

As illustrated in FIG. 5A, in one or more embodiments, process control system 503 ascertains process data measurements 502 obtained from measurement devices associated with process 501, such as one or more Internet of Things (IoT) devices. Those skilled in the art will note that the particular data measurements obtained from process 501 depend on the manufacturing or industrial process 501 being controlled.

In the embodiment of FIG. 5A, process data measurements 502 are fed as a stream of process data 504 to an artificial intelligence engine, such as described above in in connection with FIGS. 1-4, for generating an artificial intelligence-based control setpoint recommendation 506. Additionally, in one or more embodiments, the process data measurements are stored to a historical process data database 510, along with associated control setpoints for the current process state (or process state instance).

As noted, in one embodiment, one or more machine learning setpoint models are trained and used by an artificial intelligence engine in generating artificial intelligence-based control system setpoint recommendation 506 from the streaming process data 504. In one embodiment, the process control setup can be described as a constraint optimization problem, where constraints are process control limits, and an objective function is the process objective, often process efficiency or yield, which can be expressed as:

$$\max_a \Phi(S, a)$$

$$\text{s.t. } S_{upper} \le f(S, a) \le S_{lower}$$

where:
- a represents an action, which are often a setpoint recommendation,
- S represents process state variables,
- $\Phi$ is the process objective,
- $f$ is the system response function to a given action a, and
- s.t. means such that.

Often, the response function modeling can be a complex process, and many data-driven predictors can be used to achieve an estimate for system response, given a current process state, and the action course. The process objective $\Phi$ is an explicit mathematical equation, or statistical estimate. The quality of the final action (control setpoint recommendation) can be highly dependent on the faithfulness of the modeling accuracy of $f$ and $\Phi$.

As disclosed herein, data-analysis-based confirmation and/or refinement of the artificial intelligence recommended process setpoint is provided, which includes evidence-based processing of the AI control setpoint recommendation 508. As disclosed herein, the evidence-based processing of the control setpoint recommendation can include obtaining (or referencing), by one or more processors, historical process data instances, and associated control setpoints, related to the current state of the process. For instance, in one implementation, the historical process data database 510 is searched to identify historical state instances of process 501, and their associated control setpoints, which are related to the current state of the process. The evidence-based processing of the control setpoint recommendation 508 further includes comparing, by the one or more processors, the artificial intelligence recommended control setpoint for process 501 to the associated control setpoints of the historical process state instances related to the current state of the process.

For instance, in one or more embodiments, the evidence-based processing of the control setpoint recommendation can include analyzing the ascertained historical process state instances, and based on process responses to the associated control setpoints, grouping the associated control setpoints into a positive action group and a negative action group, where the positive action group contains associated control setpoints with process responses that facilitate a current process optimization objective, and the negative action group contains associated control setpoints with process responses that are potentially unfavorable to the current process optimization objective. In one or more embodiments, the current process optimization objective includes a process constraint, where the positive action group contains associated control setpoints which satisfy the process constraint, where the negative action group contains associated control setpoints which fail the process constraint.

In one or more embodiments, the comparing includes determining that the artificial intelligence recommended control setpoint 506 falls within a contour of the positive action group, and based on the artificial intelligence recommended control setpoint falling within the contour of the positive action group, the artificial intelligence recommended control setpoint is used as the evidence-based control setpoint 512 provided to update the respective control system setpoint 514 for control of process 501.

Further, evidence-based processing of control setpoint recommendation 508 can include, in one or more embodiments, determining that the artificial intelligence recommended control setpoint falls within a contour of the negative action group, and based on the artificial intelligence recommended control setpoint falling within the contour of the negative action group, refining the artificial intelligence recommended control setpoint to obtain a refined control setpoint that falls within the contour of the positive action group, and providing the evidence-based refined control setpoint 512 for use as the control setpoint 514 for controlling process 501. In one or more embodiments, refining the artificial intelligence recommended control setpoint includes modifying the artificial intelligence recommended control setpoint to obtain the refined control setpoint that falls within the contour of the positive action group, with a least amount of compromise of the current process optimization objective.

In one or more embodiments, the evidence-based processing of control setpoint recommendation can include context-based evidence mining, determining a context-dependent action boundary, and providing context-based setpoint guidance. Context-based evidence mining evaluates the timeseries data, that is, the historical process data, to determine related historical process state instances to the current state of the process. In the context of process control, each control trajectory can be represented as a tuple of three elements $(x_t, a_{t+1}, x_{t+1})$, which represent the current state of the system, the action, and state updates, respectively. By ascertaining the current state, the past instances of the process where the system state was similar or related, and the associated actions, identifying a set of feasible actions is facilitated for the current state of the process.

In one or more embodiments, context-based evidence mining can include or use, for instance, the following:

The estimation functions for process controls are active forecasting in nature. Thus, the model input and output can be represented with a tuple $(s_t, a_{t+1}, s_{t+1})$, where $s_t$ is the current state of the system, $a_{t+1}$ is the action taken, and $s_{t+1}$ is the system response.

$S_t$ represents the current context. The context-based evidence mining can fetch all historical evidence from the database, where similar states were observed. The similarity measure can be defined by a distance metric:

$$d\left(s_2^1, s_t^2\right) \mapsto \mathcal{R}^+$$

Context action evidence can be given as:

$$\mathcal{A}(s_t) := \left\{a_{t'} : \langle s_{t'}, a_{t'}, s_{t'+1} \rangle \text{ s.t. } d\left(s_t, s_{t1}\right) < \in \right\}$$

Context-based mined evidence is further classified into two bins:

$$\mathcal{A} = \mathcal{A}^+ \bigcup \mathcal{A}^-$$

$$\mathcal{A}^+(s_t) :=$$

$$\left\{a_{t'} : \langle s_{t'}, a_{t'}, s_{t'+1} \rangle \text{ s.t. } d\left(s_t, s_{t1}\right) < \in \text{ and } (S_{lower} \le s_{t'+1} \le S_{upper})\right\}$$

$$\mathcal{A}^-(s_t) = \frac{\mathcal{A}(s_t)}{\mathcal{A}^+(s_t)}$$

Thus, evidence partition $A^+$ supports action set evidence that satisfies all process constraints, while $A^-$ are unfavorable evidence values, where constraints are violated.

If the AI recommendation is within the negative evidence group, the suggested recommendation violates the prior evidence, and therefore is considered high risk action.

In such a case, assume the current setpoint recommendation is a*, and the favorable evident set is given as $\mathcal{A}^+$, then the setpoint update process can be represented as:

$$\min_a |\Phi(s_t, a^*) - \Phi(s_t, a)| + \lambda \||a^* - a\||_2^2$$

$$\text{s.t. } a \in \mathcal{A}^+$$

where:

$\mathcal{A}^+$=positive evidence group or partition, $\Phi$=process objective, $S_t$=current state of the system, a*=current setpoint recommendation, and a=an action (i.e., setpoint recommendation).

Figure 5B:
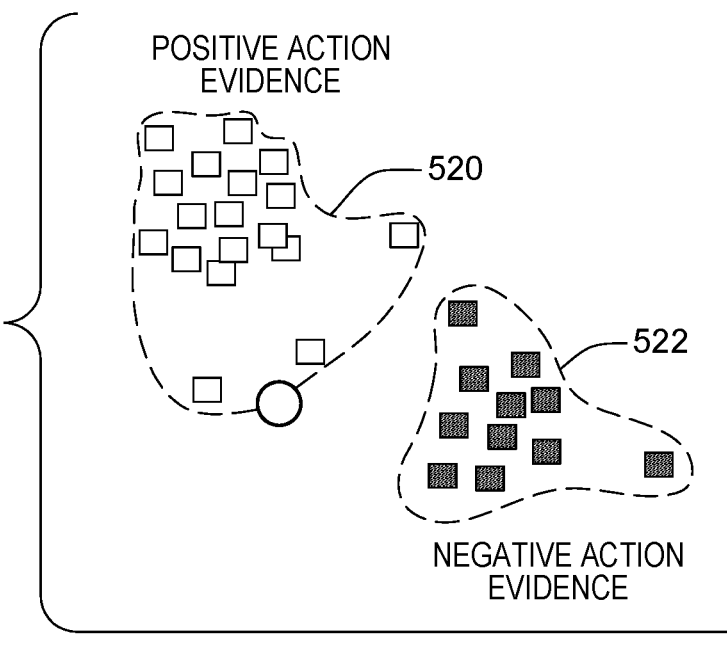
FIG. 5B is an exemplary illustration of control setpoints grouped into a positive action evidence group and a negative action evidence group, in accordance with one or more aspects of the present disclosure.

Based on the context analyzing, process responses can be marked as favorable actions or unfavorable actions for the current process optimization objective. An example of this is depicted in FIG. 5B, where the evidence-based setpoints include a group of positive action setpoints 520 and a group of negative action setpoints 522, which are separately grouped with a respective contour around each grouping. In this manner, the groupings can provide evidence of either a positive or negative (favorable or unfavorable) action, with the action contours 520, 522 depicting the shapes of respective known evidences (that is, based on the historical process data). In this manner, the control system and/or operator can learn based on the evidence of prior process control whether there is risk associated with a new artificial intelligence-based control setpoint recommendation.

Figure 5C:
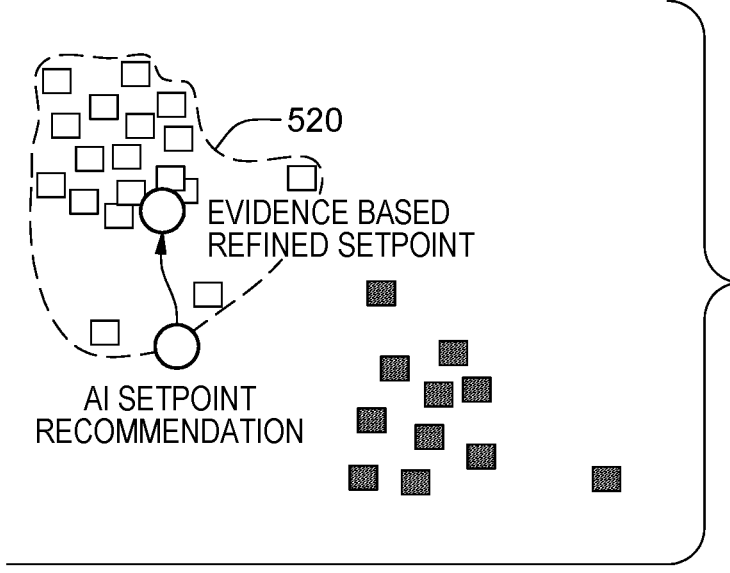
FIG. 5C depicts the exemplary illustration of FIG. 5B, with the original control setpoint recommendation shown refined to move the recommendation within a contour of the positive action evidence group, in accordance with one or more aspects of the present disclosure.

When the recommended control setpoint action is outside of the favorable contour or distribution (i.e., outside the positive action group), or in the unfavorable contour or distribution (i.e., the negative action group), a shape-constrained search can be conducted to optimally update the setpoint recommendation (i.e., to refine the artificial intelligence recommended control setpoint) with a least amount of compromise of the process optimization objective. An example of this is depicted in FIG. 5C, where the artificial intelligence recommended control setpoint is refined (or updated) to move the refined control setpoint into the contour of the positive action group 520.

Advantageously, disclosed herein are certain novel computer-implemented methods, computer systems and computer program products which facilitate, in part, interactive updating of artificial intelligence recommended control setpoints, guided by historical process data evidence of state instances of the process related to the current state of the process, and their associated control setpoints, and the resulting process actions. The evidence-based processing of the control setpoint recommendation enables the process control system to locate historical evidences supporting, or not supporting, a current setpoint recommendation. In one or more embodiments, context-dependent evidence searching is utilized, where the query context is the current state of the process. The current state can be represented with the current known state variable trajectory. In one or more embodiments, the evidence-based processing of the control setpoint recommendation also marks if there is favorable or unfavorable evidence that resembles the current setpoint recommendation, and when unfavorable, marks an associated risk to the artificial intelligence recommend control setpoint. For instance, in one or more embodiments, the historical process data or evidence can be classified into a favorable or unfavorable category, with the favorable category being those setpoint control actions that do not violate the process constraints. In this manner, the evidence-based processing of control setpoint recommendation of the process control system allows evidence-supported confirmation or guided refinement of a setpoint control recommendation, and in one or more embodiments, also predicts risks and/or costs incurred due to a particular recommendation update. For instance, in one or more embodiments, local timeseries-based data can be used with what if analysis to determine, for instance, a minimal correction to the trajectory which puts the setpoint recommendation into the favorable category, that is, into the positive action group contour. This analysis also surfaces, in one embodiment, a minimal cost incurred in the course correction, that is, any change in the process objectives in the model-driven fashion.

Figure 6:
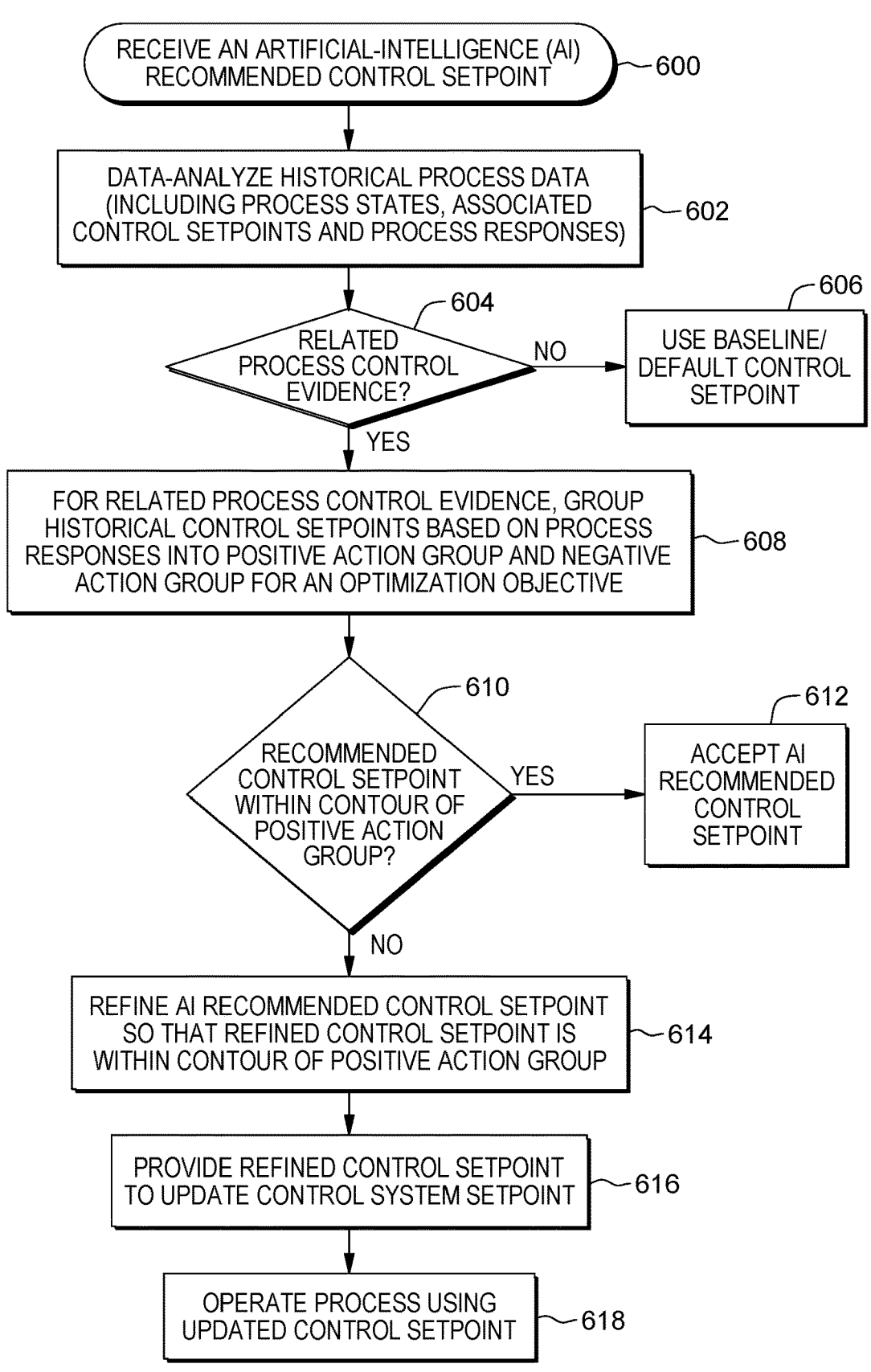
FIG. 6 depicts another embodiment of a setpoint control workflow, in accordance with one or more aspects of the present disclosure.

By way of further example, FIG. 6 depicts another embodiment of control system processing, in accordance with one or more aspects of the present disclosure. As illustrated, the processing receives (e.g., generates, obtains, etc.) an artificial intelligence (AI) recommended control setpoint 600 and analyzes historical process data to obtain historical process state instances, and associated control setpoints, related to a current state of the process 602. The workflow includes determining whether there is related process control evidence to the current state of the process 604, and if "no", then the process uses a baseline and/or default control setpoint 606 for the respective control system setpoint being updated for the process.

For related process control evidence, the historical control setpoints are grouped based on process responses into a positive action group and a negative action group for an optimization objective 608. Processing determines whether the recommended control action is within the contour of the positive action group 610, and if "yes", then the AI-recommended control setpoint is accepted 612 for updating the control system setpoint for operating the process. Assuming that the recommended control action is not within the contour of the positive action group, then the AI-recommended control setpoint is refined so that the refined control setpoint is within the contour of the positive action group 614. In this case, the refined control setpoint is provided for use in updating the control system setpoint 616, and the process is operated using the updated control setpoint 618.

FIG. 7 illustrates an exemplary table, where the positive control action group and negative control action group provide associated risks, based on whether there is context-guided evidence, minimal evidence, or no evidence. In the case of guided evidence, the artificial intelligence recommended control setpoint being within the positive control action group confirms that the artificial intelligence-generated control setpoint can be used in updating the control system setpoint, while minimal evidence provides weak evidence that the artificial intelligence-generated control setpoint can be used. With no evidence, there is uncertainty with using the artificial intelligence-generated control setpoint. Similarly, where the artificial intelligence-generated control setpoint falls within the negative control action group, then in the case of there being context-guided evidence, there is a high risk associated with using the recommended control setpoint without refinement, while if there is minimal evidence, then there is a probable risk, while if there is no evidence, the risk is uncertain. As explained herein, given the evidence support, the control system (or operator) can decide to refine or update the recommended control setpoint to, for instance, move the refined control setpoint into the positive action group contour.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented comprising:

generating, for a current state of a process, an artificial intelligence recommended control setpoint for the process;

obtaining, by one or more processors, historical process state instances, and associated control setpoints, related to the current state of the process;

comparing, by the one or more processors, the artificial intelligence recommended control setpoint for the process to the associated control setpoints of the historical process state instances related to the current state of the process;

updating, based on a result of the comparing, a control system setpoint for the process for optimal control of the process for a current process optimization objective, wherein updating, based on the result of the comparing, the control system setpoint comprises modifying the artificial intelligence recommended control setpoint based on one or more associated control setpoints of one or more of the obtained historical process state instances, and wherein the updating comprises refining the artificial intelligence recommended control setpoint to obtain an updated control setpoint with a least amount of compromise of the current process optimization objective; and operating the process using the updated control system setpoint to optimally control the process for the current process optimization objective, wherein the updated control system setpoint comprises a parameter applied to control one or more actions of the process to influence operation of the process.

2. The computer-implemented method of claim 1, further comprising analyzing the obtained historical process state instances, based on process responses to the associated control setpoints, and grouping the associated control setpoints into a positive action group and a negative action group, the positive action group containing associated control setpoints with process responses that facilitate the current process optimization objective, and the negative action group containing associated control setpoints with process responses that are potentially unfavorable to the current process optimization objective.

3. The computer-implemented method of claim 2, wherein the current process optimization objective comprises a process constraint, and the positive action group contains associated control setpoints which satisfy the process constraint, and the negative action group contains associated control setpoints which fail the process constraint.

4. The computer-implemented method of claim 2, wherein the comparing includes determining that the artificial intelligence recommended control setpoint falls within a contour of the positive action group, and based on the artificial intelligence recommended control setpoint falling within the contour of the positive action group, using the artificial intelligence recommended control setpoint in the updating of the control system setpoint for the process.

5. The computer-implemented method of claim 2, wherein the comparing includes determining that the artificial intelligence recommended control setpoint falls within a contour of the negative action group, and based on the artificial intelligence recommended control setpoint falling within the contour of the negative action group, refining the artificial intelligence recommended control setpoint to obtain a refined control setpoint that falls within the contour of the positive action group, and using the refined control setpoint in updating the control system setpoint for the process.

6. The computer-implemented method of claim 5, wherein the refining comprises modifying the artificial intelligence recommended control setpoint to obtain the refined control setpoint that falls within the contour of the positive action group with a least amount of compromise of the current process optimization objection.

7. The computer-implemented method of claim 1, wherein generating the artificial intelligence recommended control setpoint comprises generating the artificial intelligence recommended control setpoint using a machine learning setpoint model, and wherein the computer-implemented method further comprises training the machine learning setpoint model to provide control setpoint recommendations for the process, the training using, at least in part, a dataset comprising historical data obtained from monitoring operation of the process.

8. The computer-implemented method of claim 1, further comprising providing a default control setpoint for updating of the control system setpoint where the obtaining fails to identify any historical process state instances, and associated control setpoints, related to the current state of the process.

9. The computer-implemented method of claim 1, further comprising determining, based on the comparing of the artificial intelligence recommended control setpoint for the process to the associated control setpoints of the historical process state instances related to the current state of the process, a risk factor associated with using the artificial intelligence recommended control setpoint in the updating of the control system setpoint for the process.

10. A computer system comprising:
a memory; and
at least one processor in communication with the memory, wherein the computer system is configured to perform a method, the method comprising:
  generating, for a current state of a process, an artificial intelligence recommended control setpoint for the process;
  obtaining, by the at least one processor, historical process state instances, and associated control setpoints, related to the current state of the process;
  comparing, by the at least one processor, the artificial intelligence recommended control setpoint for the process to the associated control setpoints of the historical process state instances related to the current state of the process;
  updating, based on a result of the comparing, a control system setpoint for the process for optimal control of the process for a current process optimization objective, wherein updating, based on the result of the comparing, the control system setpoint comprises modifying the artificial intelligence recommended control setpoint based on one or more associated control setpoints of one or more of the obtained historical process state instances, and wherein the updating comprises refining the artificial intelligence recommended control setpoint to obtain an updated control setpoint with a least amount of compromise of the current process optimization objective; and
  operating the process using the updated control system setpoint to optimally control the process for the current process optimization objective, wherein the updated control system setpoint comprises a parameter applied to control one or more actions of the process to influence operation of the process.

11. The computer system of claim 10, further comprising analyzing the obtained historical process state instances, based on process responses to the associated control setpoints, and grouping the associated control setpoints into a positive action group and a negative action group, the positive action group containing associated control setpoints with process responses that facilitate the current process optimization objective, and the negative action group containing associated control setpoints with process responses that are potentially unfavorable to the current process optimization objective.

12. The computer system of claim 11, wherein the current process optimization objective comprises a process constraint, and the positive action group contains associated control setpoints which satisfy the process constraint, and the negative action group contains associated control setpoints which fail the process constraint.

13. The computer system of claim 11, wherein the comparing includes determining that the artificial intelligence recommended control setpoint falls within a contour of the positive action group, and based on the artificial intelligence recommended control setpoint falling within the contour of the positive action group, using the artificial intelligence recommended control setpoint in the updating of the control system setpoint for the process.

14. The computer system of claim 11, wherein the comparing includes determining that the artificial intelligence recommended control setpoint falls within a contour of the negative action group, and based on the artificial intelligence recommended control setpoint falling within the contour of the negative action group, refining the artificial intelligence recommended control setpoint to obtain a refined control setpoint that falls within the contour of the positive action group, and using the refined control setpoint in updating the control system setpoint for the process.

15. The computer system of claim 14, wherein the refining comprises modifying the artificial intelligence recommended control setpoint to obtain the refined control setpoint that falls within the contour of the positive action group with a least amount of compromise of the current process optimization objection.

16. The computer system of claim 10, wherein generating the artificial intelligence recommended control setpoint comprises generating the artificial intelligence recommended control setpoint using a machine learning setpoint model, and wherein the computer-implemented method further comprises training the machine learning setpoint model to provide control setpoint recommendations for the process, the training using, at least in part, a dataset comprising historical data obtained from monitoring operation of the process.

17. A computer program product comprising:
at least one computer readable storage media and program instructions collectively stored on the at least one computer readable storage media readable by at least one processor to:

generate, for a current state of a process, an artificial intelligence recommended control setpoint for the process;

obtain, by the at least one processor, historical process state instances, and associated control setpoints, related to the current state of the process;

compare, by the at least one processor, the artificial intelligence recommended control setpoint for the process to the associated control setpoints of the historical process state instances related to the current state of the process;

updating, based on a result of the comparing, a control system setpoint for the process for optimal control of the process for a current process optimization objective, wherein updating, based on the result of the comparing, the control system setpoint comprises modifying the artificial intelligence recommended control setpoint based on one or more associated control setpoints of one or more of the obtained historical process state instances, and wherein the updating comprises refining the artificial intelligence recommended control setpoint to obtain an updated control setpoint with a least amount of compromise of the current process optimization objective; and operating the process using the updated control system setpoint to optimally control the process for the current process optimization objective, wherein the updated control system setpoint comprises a parameter applied to control one or more actions of the process to influence operation of the process.

18. The computer program product of claim 17, wherein the program instructions further analyze the obtained historical process state instances, based on process responses to the associated control setpoints, and group the associated control setpoints into a positive action group and a negative action group, the positive action group containing associated control setpoints with process responses that facilitate the current process optimization objective, and the negative action group containing associated control setpoints with process responses that are potentially unfavorable to the current process optimization objective.

19. The computer program product of claim 18, wherein the comparing includes determining that the artificial intelligence recommended control setpoint falls within a contour of the positive action group, and based on the artificial intelligence recommended control setpoint falling within the contour of the positive action group, using the artificial intelligence recommended control setpoint in the updating of the control system setpoint for the process.

20. The computer program product of claim 18, wherein the comparing includes determining that the artificial intelligence recommended control setpoint falls within a contour of the negative action group, and based on the artificial intelligence recommended control setpoint falling within the contour of the negative action group, refining the artificial intelligence recommended control setpoint to obtain a refined control setpoint that falls within the contour of the positive action group, and using the refined control setpoint in updating the control system setpoint for the process.

* * * * *